(12) United States Patent
Anderson et al.

(10) Patent No.: US 6,771,284 B1
(45) Date of Patent: Aug. 3, 2004

(54) SYSTEM AND METHOD OF PROVIDING A NAVIGATIONAL AIDE

(75) Inventors: Glen J. Anderson, Sioux City, IA (US); Michael J. Calvillo, Sioux City, IA (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/516,623

(22) Filed: Mar. 1, 2000

(51) Int. Cl.[7] ............................................... G06F 3/14
(52) U.S. Cl. ..................... 345/705; 345/711; 345/810; 345/862; 345/787; 345/864
(58) Field of Search ................... 345/705, 856, 345/711, 810, 817, 973, 862, 786, 787, 864, 776, 777

(56) References Cited

U.S. PATENT DOCUMENTS

| | | | |
|---|---|---|---|
| 5,251,125 A | 10/1993 | Karnowski et al. | 364/189 |
| 5,546,521 A | 8/1996 | Martinez | 395/155 |
| 5,664,133 A | 9/1997 | Malamud et al. | 345/352 |
| 5,754,176 A | 5/1998 | Crawford | 345/338 |
| 5,757,370 A * | 5/1998 | Amro et al. | 345/787 |
| 5,790,122 A * | 8/1998 | Cecchini et al. | 345/854 |
| 5,805,167 A | 9/1998 | van Cruyningen | 345/353 |
| 5,825,357 A | 10/1998 | Malamud et al. | 345/340 |
| 5,828,376 A | 10/1998 | Solimene et al. | 395/352 |
| 5,854,630 A | 12/1998 | Nielsen | 345/352 |
| 5,900,877 A | 5/1999 | Weiss et al. | 345/356 |
| 5,914,716 A | 6/1999 | Rubin et al. | 345/347 |
| 5,937,417 A * | 8/1999 | Nielsen | 715/513 |
| 6,204,846 B1 * | 3/2001 | Little et al. | 345/784 |
| 6,247,018 B1 * | 6/2001 | Rheaume | 707/102 |

OTHER PUBLICATIONS

Lonnie E. Moseley et al. Microsoft Office 97, 1996 SYBEX, Inc.*

* cited by examiner

*Primary Examiner*—Kristine Kincaid
*Assistant Examiner*—Thomas T. Nguyen
(74) *Attorney, Agent, or Firm*—Scott Charles Richardson; R. Christopher Rueppell; Suiter-West

(57) ABSTRACT

The present invention is directed to a system and method of providing a navigational aide. In a first aspect of the present invention, a system and method of providing a navigational aide includes monitoring data displayed on a display device and detecting a marker of a section of the displayed data. A navigational aide is displayed in response to the detected marker of the section of displayed data.

66 Claims, 9 Drawing Sheets

SYSTEM AND METHOD OF PROVIDING A NAVIGATIONAL AIDE

FIELD OF THE INVENTION

The present invention generally relates to the field of methods of navigation in a network and computer related environment, and particularly to a system and method of providing a navigational aide.

BACKGROUND OF THE INVENTION

With the ever increasing size of modern display devices, users interacting with data on an information handling system, such as applications including web browsers, word processors, spreadsheets, and the like, must navigate over larger and larger display areas. Although the ability to see and interact with more data at a given time may be a great benefit to a user, the time spent navigating between data, both displayed on the display device and available in other applications, may result in a great loss of time. For example, after scrolling to the bottom of a Web page, a user's cursor typically is not conveniently positioned to perform navigation functions, such as "Back". Therefore, the user has to track the cursor across the screen to the navigation controls, then click on "Back" with the use of a cursor control device.

One method used to address this problem is to allow the user to specify a different location for the navigation bar. However, the user-specified location may not be convenient in situations in which the cursor is positioned at the top of the display window. This problem is magnified when a user needs to visually scan many sets of data, requiring extra cursor repositioning beyond the effort needed to perform the target task of interacting with the displayed data. Other methods used to address this problem, such as special keyboard keys and extra mouse buttons have been proposed, but these methods require the use of non-standard hardware, making them difficult if not impossible to utilize on current information handling systems. These methods also require the user to go outside of the current and intuitive input method of pointing a mouse and a mouse button.

Therefore, it is desirable to provide a system of method of providing a navigational aide capable of being utilized with current information handling systems in an intuitive manner.

SUMMARY OF THE INVENTION

Accordingly, the present invention is directed to a system and method of providing a navigational aide. In a first aspect of the present invention, a system and method of providing a navigational aide includes monitoring data displayed on a display device and detecting a marker of a section of the displayed data. A navigational aide is displayed in response to the detected marker of the section of displayed data.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring now to FIGS. 1 through 10, exemplary embodiments of the present invention are shown. A variety of sections of data suitable for display on a display device may be utilized by the present invention. Sections of data include but are not limited to web pages, word processing documents, spreadsheets, images, textual information, and the like as contemplated by a person of ordinary skill in the art. Further, a section of data, such as a word processing document, may contain additional sections of data, such as pages, tables, text boxes, and the like. A navigational aide may include a navigation bar, pop-up menu, list of resources available in a specified section of data and the like suitable for providing navigational features to a user and not depart from the spirit and scope of the present invention.

Figure 1:
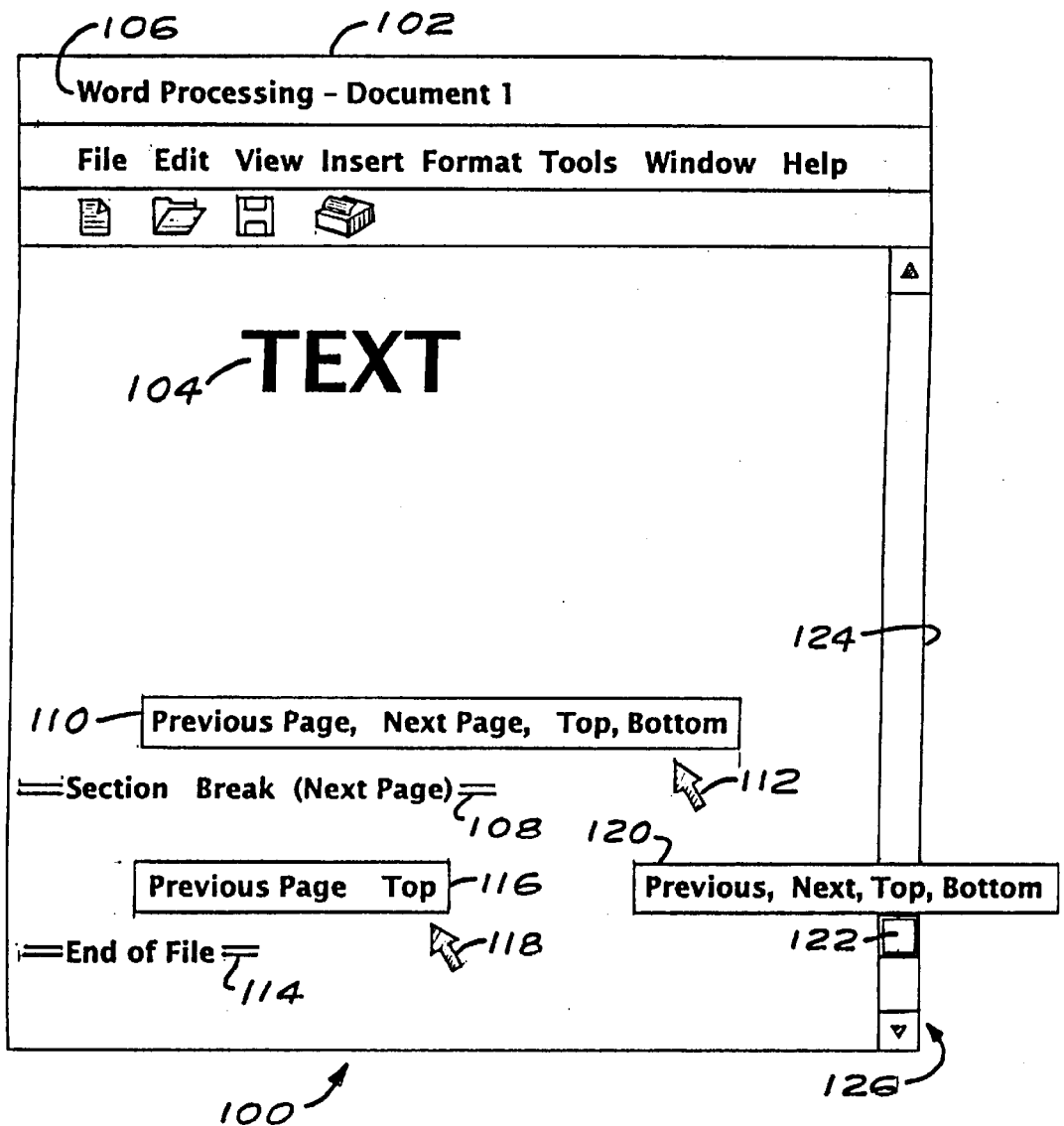
FIG. 1 is an illustration of an exemplary embodiment of the present invention wherein a display of data formatted as a word processing document includes navigational aides provided in response to detected markers of sections of the displayed data.

Referring now to FIG. 1, an illustration of an exemplary embodiment 100 of the present invention is shown wherein a display of data formatted as a word processing document 102 includes navigational aides provided in response to detected markers of sections of the displayed data. A display of data is formatted as a word processing document 102 utilizing text 104 in a word processing application 106. A navigational aide may be displayed in response to a variety of detected markers of sections of data. For example, a section break 108 may be utilized as a marker of a section of displayed data. In response to the detected section break, a navigational aide, formatted as a navigation bar 110, may be displayed to enable a user to navigate to different sections of the data. It may be desirable to display the navigation bar 110 proximally to a cursor 112 to enable the user to navigate with minimal movement. Additionally, an end-of-file marker 114 may be utilized as a marker to indicate a section of displayed data, in this instance the entirety of the document. A display of a navigation bar 116 may be positioned adjacent to a cursor 118 to enable navigation. Thus, once a marker of a section of data is detected, a navigational aide may be displayed in response to the user positioning a cursor over the indication contained in the data.

It may also be desirable to enable a navigational aide to be displayed automatically without depending on cursor location. For example, a navigational aide 120 may be displayed proximally to a scroll box 122, in this instance utilized as a marker, positioned on a bar 124 of a scroll bar software feature 126. Thus, the navigational aide 120 may be provided automatically in response to a predetermined event without the requirement of a user positioning a cursor.

Additionally, it may be desirable to configure the navigational aide based upon the detected content. For example, the navigational aide 110 corresponding to a marker of a section break 108 for a next page may contain navigational functions such as previous page, next page, top of the document, bottom of the document, and the like. However, a navigational aide 116 corresponding to an end of file 114 marker may supply navigational functions such as previous page and top of document, since there is no available next page and the user is already at the bottom of the document. In this manner, a navigational aide may provide context sensitive functions thus permitting more efficient utilization, manipulation and interaction with the data. Further, the navigation aide may be formatted to correspond to the application and context in which it is being utilized, such as browser navigation functions in a browser application, downloads contained on a web page, links in the page, page navigation functions in a word processing application, sheet navigation functions in a spreadsheet application, user options contained in the display of data, and the like and the like without departing from the spirit and scope of the present invention.

Figure 2:
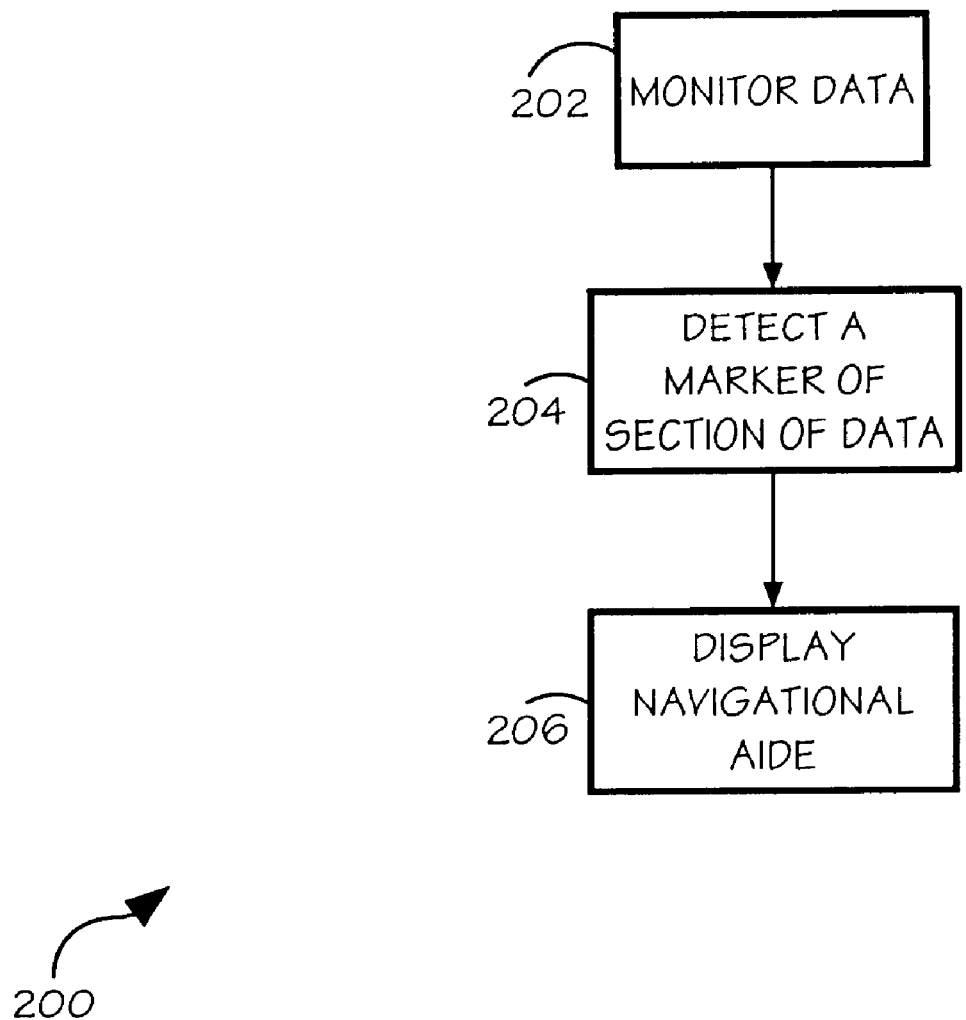
FIG. 2 depicts a flow diagram of an exemplary method of the present invention wherein a navigational aide provided in response to a detected marker of a section of data is shown.

Referring now to FIG. 2, an exemplary method 200 of the present invention is shown wherein a navigational aide is provided in response to a detected marker of a section of data. Data is monitored 202, and if a marker of a section of data is detected 204, a navigational aide is displayed 206. The navigational aide may provide navigation to another application or across applications, an example of which is shown in FIG. 3.

Figure 3:
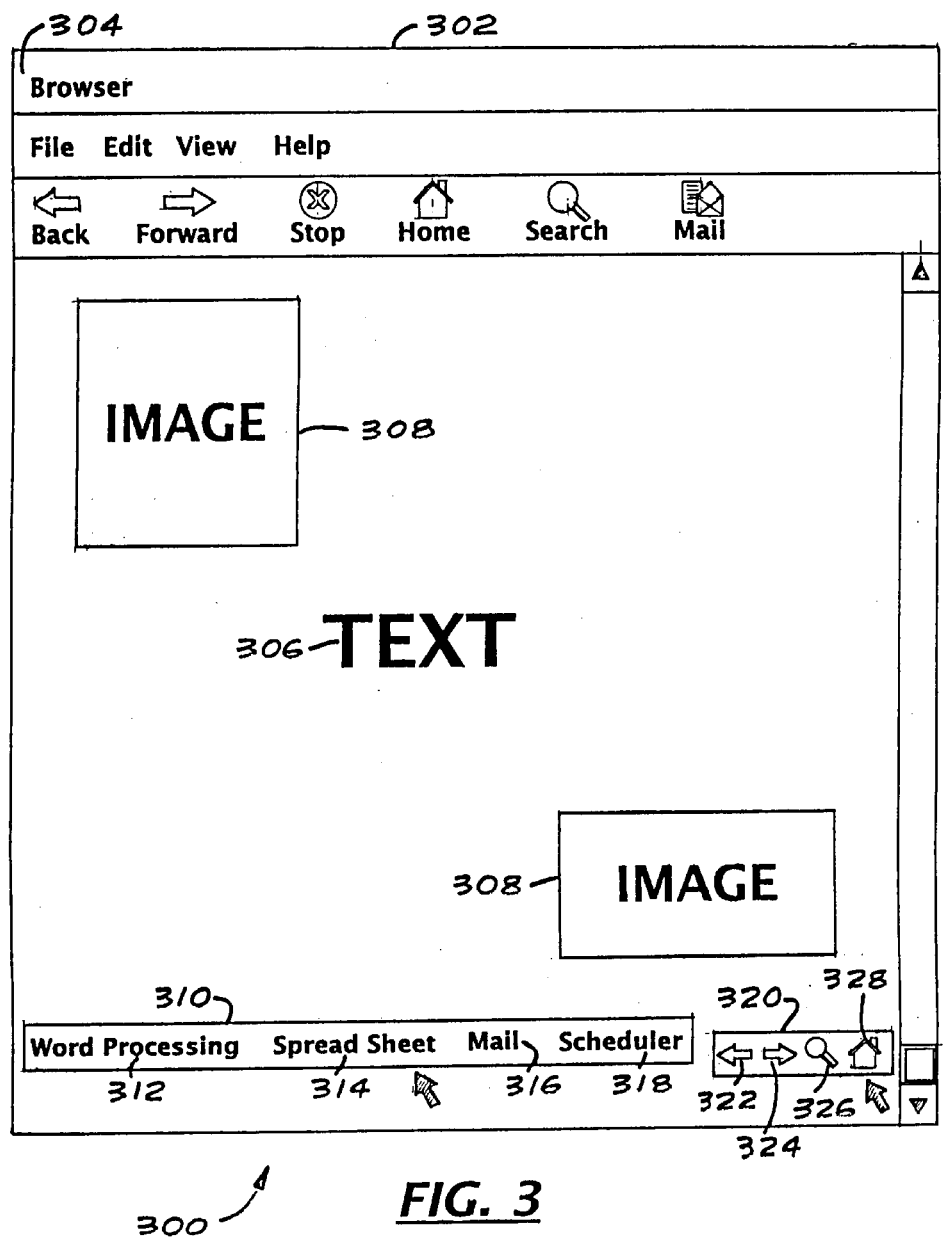
FIG. 3 is an illustration of an exemplary embodiment of the present invention wherein data formatted as a web page in a browser application includes navigational aides suitable for providing navigation to another application and/or across the application itself.

Referring now to FIG. 3, an illustration of an exemplary embodiment 300 of the present invention is shown wherein data formatted as a web page 302 in a browser application 304 includes navigational aides suitable for providing navigation to another application and/or across the application itself. The web page 302 may include text 306 and images 308. A navigational aide may be displayed in response to a variety of detected markers of sections of data in a manner permitting a user to navigate between and within applications. For example, a navigation aide 310 may be displayed at the boundary of a document including navigation functions to a word processing application 312, spreadsheet application 314, email application 316, scheduler 318, and the like. A navigation aide 320 may also be displayed to permit navigation within the application and data, such a back 322, forward 324, search 326, home 328, and the like. Thus a user may utilize a readily accessible navigation aide to permit increased ease of use, manipulation, and interaction with data. It should be apparent that a person of ordinary skill in the art may configure a navigational aide in a variety of formats and not depart from the spirit and scope of the present invention.

Figure 4:
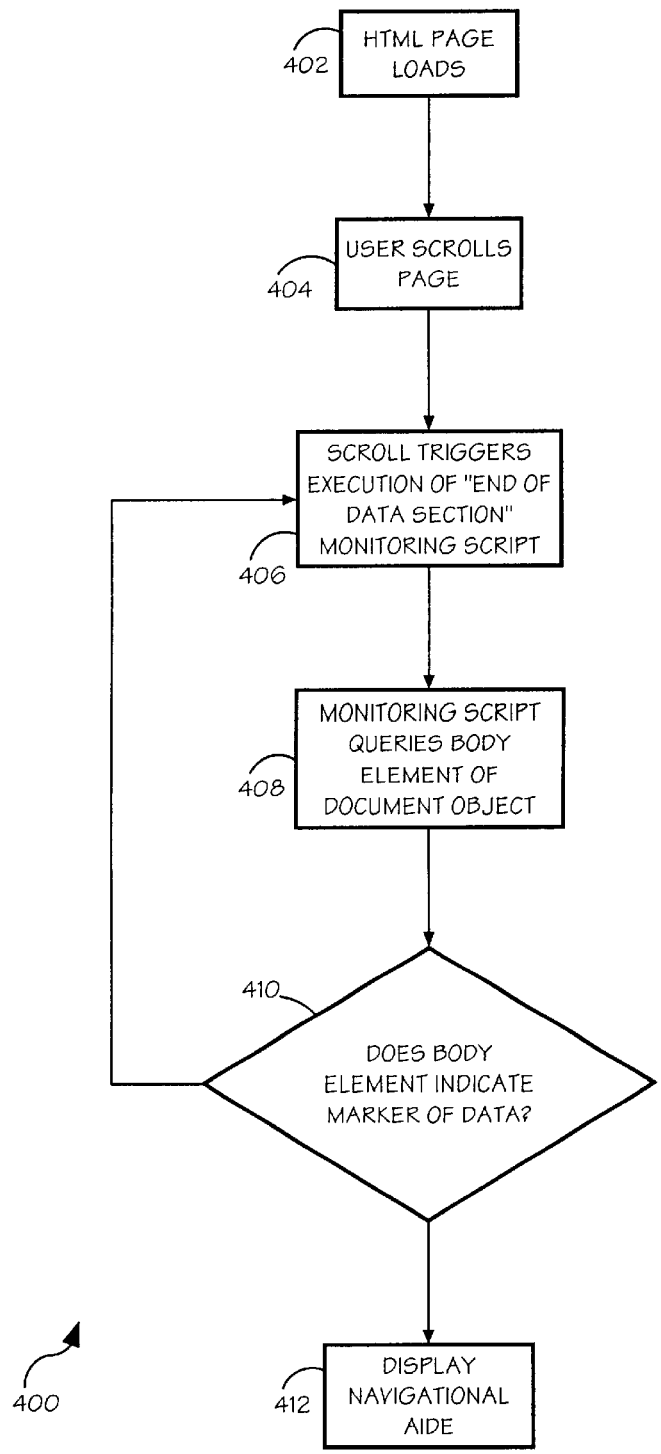
FIG. 4 is a flow diagram illustrating an exemplary method of the present invention wherein a body element contained in a hypertext markup language (HTML) is utilized as a marker of a section of data.

Referring now to FIG. 4, an exemplary method 400 of the present invention is shown wherein a body element formatted in hypertext markup language (HTML) is utilized as a marker of a section of data. Data formatted in hypertext markup language (HTML) page is loaded 402, such as a typical web page. A user, viewing the web page, scrolls down the web page 404. The scroll triggers the execution of an "end of data section" monitoring script 406. The monitoring script queries a body element of a document object 408. A body element typically specifies the beginning and end of the document body, and may be accessed from script through the document object. The document object is a construct available to hypertext markup language (HTML) scripts. If the body element indicates a marker to the section of data 410, in this instance the document object, a navigation aide is displayed 412.

Figure 5:
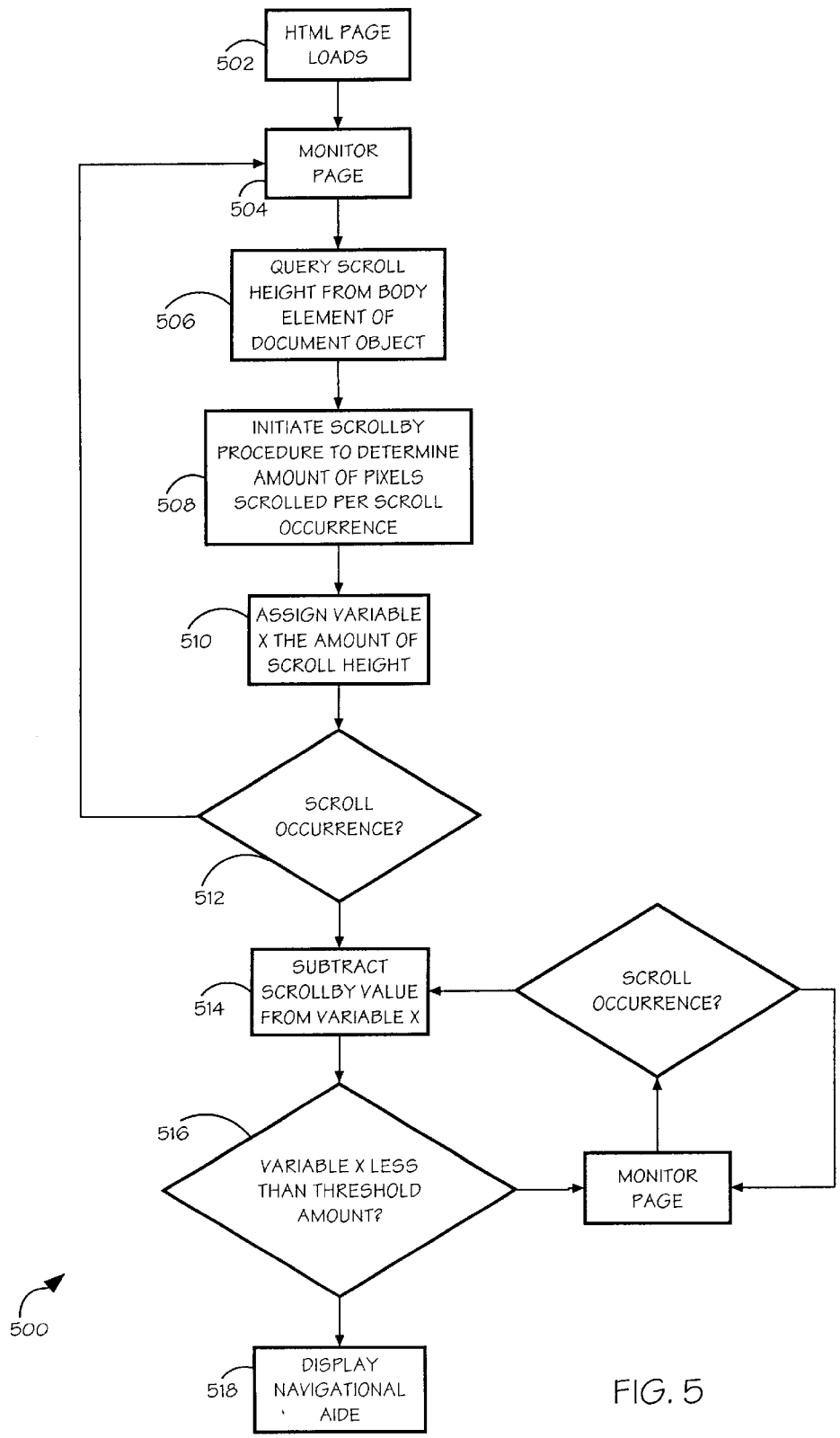
FIG. 5 is a flow diagram depicting an exemplary method of the present invention wherein the number of pixels in a section of data is utilized to determine the boundary of a section of data.

Referring now to FIG. 5, an exemplary method 500 of the present invention is shown wherein the number of pixels in a section of data is utilized to determine a marker of a section of data. A hypertext markup language (HTML) page is loaded 502 to an information handling system. The page is monitored 504 and the scroll height is queried from a body element of a document object 506. The scroll height gives the number of pixels in the body element. A scrollby procedure is initiated wherein the amount of pixels scrolled per scroll occurrence is determined 508. A variable "X" is assigned the amount of the scroll height 510. If a scroll occurrence is detected 512, the scrollby value is subtracted from the variable "X " 514. If the variable "X" is less than a threshold marker amount 516, a navigational aide is displayed 518. Thus, the actual size of the section of data may be found and utilized to determine a marker of a section of data.

The threshold marker value may be assigned utilizing a variety of methods. For example, the threshold marker value may be given a value of zero so that once a user scrolls to the absolute bottom of the displayed data, the navigational aide is displayed. In another example, the threshold marker value may be given a higher number so that the navigational aide may be displayed once the user nears the boundary of the section of displayed data, but does not actually display the boundary of the section of data. It may also be desirable to permit the threshold marker value to be user-specified so as to enable customized navigation preferences. Although a variety of methods of determining a threshold marker value are discussed, it should be apparent to a person of ordinary skill in the art that other methods may be utilized, such as utilizing the present method in a horizontal orientation, without departing from the spirit and scope of the present invention.

Figure 6:
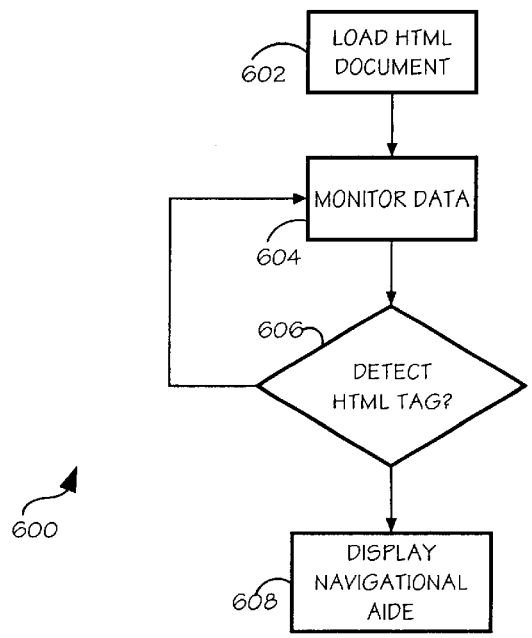
FIG. 6 depicts a flow diagram of an exemplary embodiment of the present invention wherein a hypertext markup language (HTML) tag is utilized to indicate the marker of a section of data.

Referring now to FIG. 6, an exemplary embodiment 600 of the present invention is shown wherein a hypertext markup language (HTML) tag is utilized as a marker of a section of data. In markup languages, a tag is typically used to identify an element in a document, such as a heading, paragraph, and the like, for the purposes of formatting, indexing, linking, and identifying information contained in the document. This identification information may be utilized as a marker of a section of data. For example, a user may load a web page 602. The web page may be monitored 604, and if a hypertext markup language (HTML) tag is detected, which acts as a marker of a section of data 606, a navigational aide is displayed 608. It may be preferable to display a navigational aide corresponding to the context of the detected tag. For example, if an image 308 (FIG. 3) was detected, image related navigational aides might be displayed.

Figure 7:
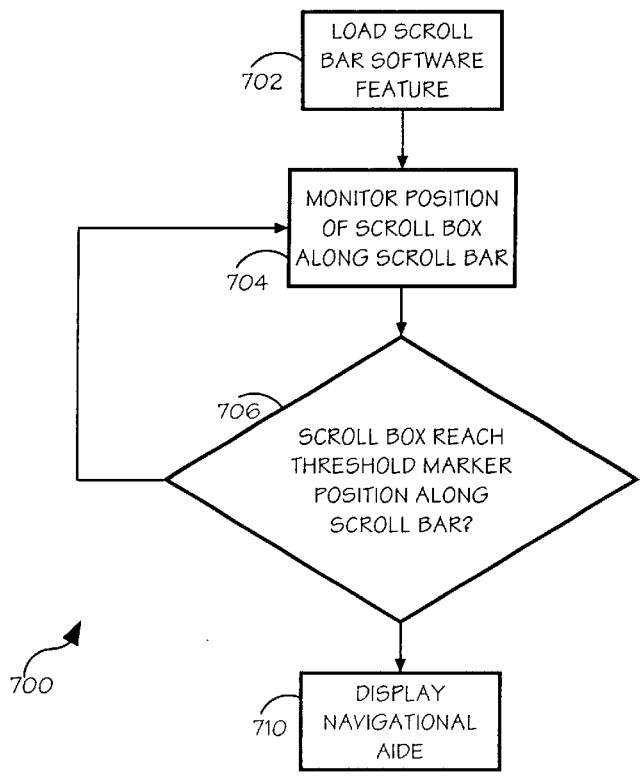
FIG. 7 is a flow diagram illustrating an exemplary method of the present invention wherein a scroll bar software feature is capable of being utilized to detect a marker of a section of data so as to initiate display of a navigational aide.

Referring now to FIG. 7, an exemplary method 700 of the present invention is shown wherein a scroll bar software feature is capable of being utilized as a marker of a section of data so as to initiate a display of a navigational aide. A scroll bar software feature is typically utilized for moving a view of data in a window on a display device, an example 126 of which is shown in FIG. 1. A scroll bar software feature is loaded 702 and the position of a scroll box 122 (FIG. 1) is monitored 704. If the scroll box reaches a threshold position along a display of a bar 124 (FIG. 1), a navigational aide 708 is displayed. The threshold position, acting as a marker, may include a user-defined position along the bar, the end of the display of the bar, near the end of the display of the bar, and the like as contemplated by a person of ordinary skill in the art. Thus, the present embodiment may be utilized by a wide variety of applications without significant changes to the application.

Figure 8:
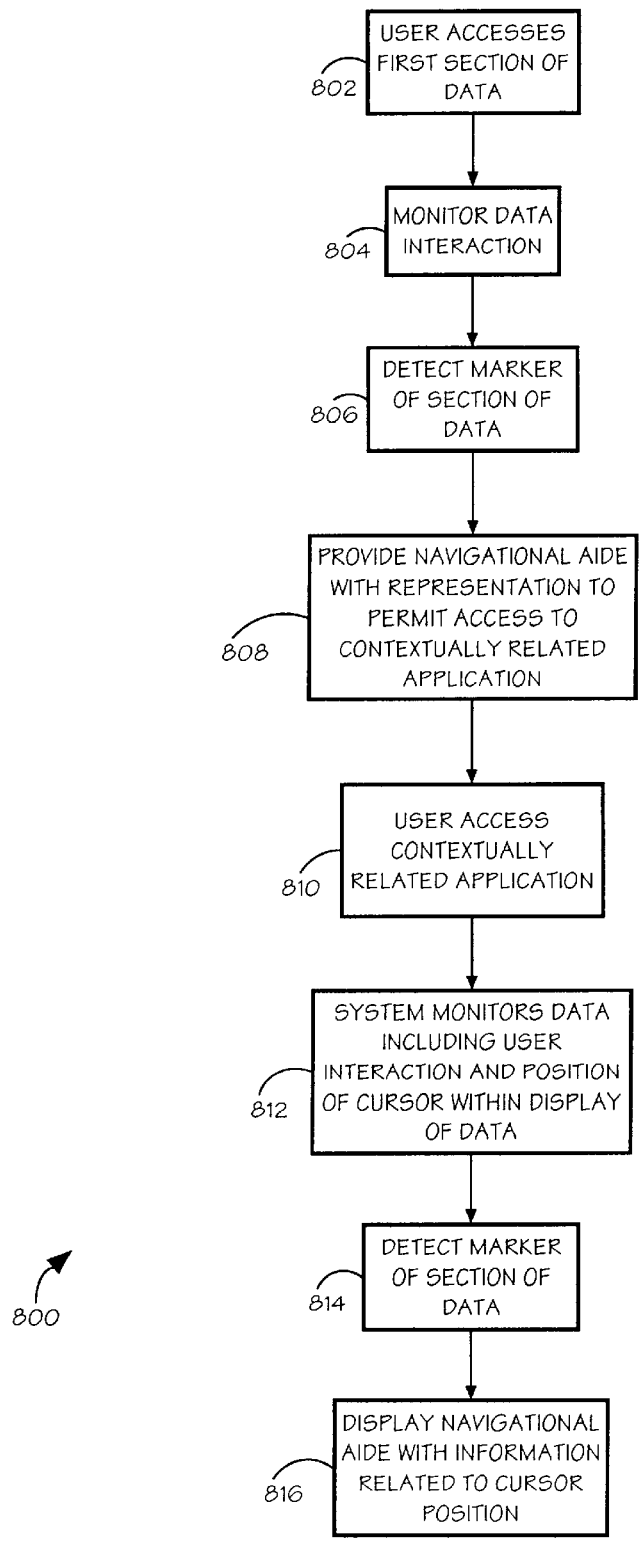
FIG. 8 is a flow diagram depicting an exemplary method of the present invention wherein a navigational aide includes navigation functions corresponding to a monitored context.

Referring now to FIG. 8, an exemplary method 800 of the present invention is shown wherein a navigational aide includes navigation functions corresponding to a monitored context. A user accesses a first section of data 802 and a system monitors the user interaction 804. Thus, when a marker is detected identifying a section of data 806, a navigational aide may be provided which includes representations to permit access to contextually related applications 808. For example, if a user interacted with textual information, textually related navigational aides may be provided. This process may continue so that as a user accesses a contextually related application 810 provided by the navigational aide, the system continues to monitor the user. The system may monitor user interaction, position of a cursor while interacting with the data 812, the context of the data that the user interacts with, and the like as contemplated by a person of ordinary skill in the art. Therefore, if a marker of a section of data is detected 814, a navigational aide formatted based on the user interaction may be displayed 816.

Figure 9:
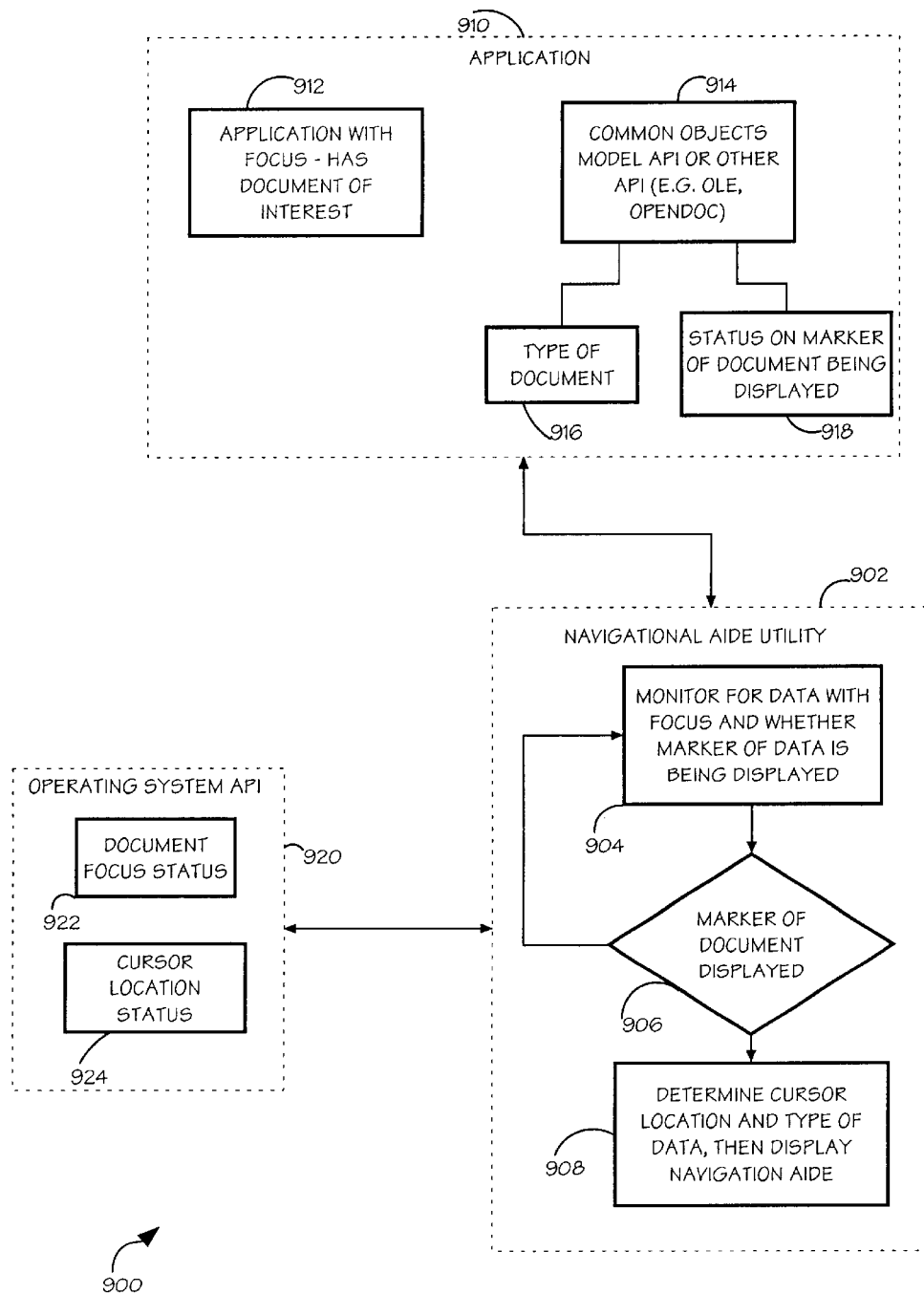
FIG. 9 is a block diagram of an exemplary embodiment of the present invention illustrating the interrelationship of a navigational aide procedure suitable for operating in the background of an information handling system operating environment with an application.

Referring now to FIG. 9, an exemplary embodiment 900 illustrating the interrelationship of a navigational aide utility suitable for operating in the background of an information handling system operating environment in conjunction with an application is shown. A navigational aide utility 902 may operate as a background application that monitors other applications through a programming interface, such as Object Linking and Embedding (OLE), common object model, and the like. Properties, such as lines of a document currently being displayed and the like, as exposed on the programming interface may be utilized to support the navigational aide.

For example, the navigational aide utility 902 may monitor an application 910 and an operating system 920. The navigational aide utility 902 may monitor for data with focus, i.e. a particular context and the like, and whether a marker of a section of data is being displayed 904. If the marker of the document is displayed 906, the navigational aide utility 902 may determine cursor location and type of data, then display the navigational aide 908. The navigational aide utility 902 may derive this information from the application 910 and operating system 920. For example, the navigational aide utility 902 may determine application focus, i.e. a relevant context such as word processing and the like, through a common objects model application programming interface (API) or other application programming interface (API) 914, such as object linking and embedding (OLE) and the like. This information may provide the type of document 916 and the status on whether the marker of the document is being displayed 918. Additionally, the navigational aide utility may derive relevant information from the operating system application program interface 920, such as the document focus status 922 and the cursor location status 924. In this way, the navigational aide utility 902 may operate with a wide variety of applications and operating systems by deriving relevant information through the application itself.

Figure 10:
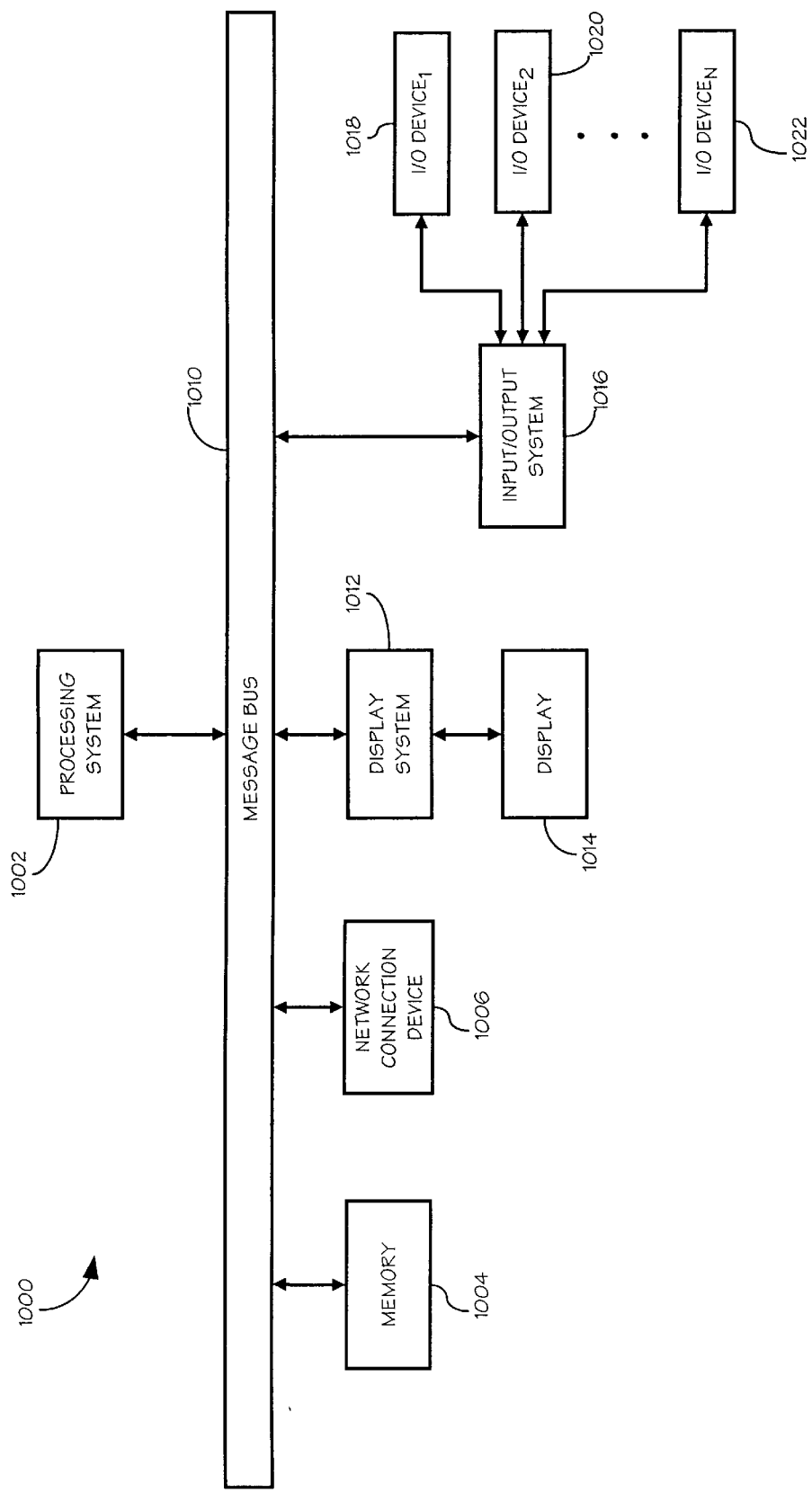
FIG. 10 is a block diagram of an information handling system operable to embody the present invention.

Referring now to FIG. 10, a hardware system in accordance with the present invention is shown. The hardware system shown in FIG. 10 is generally representative of the hardware architecture of an information handling system of the present invention. An information handling system may include a digital information appliance, convergence system, Internet appliance, and the like without departing from the spirit and scope of the present invention. A controller, for example, a processing system 1002, controls the information handling system 1000. The processing system 1002 includes a central processing unit such as a microprocessor or microcontroller for executing programs, performing data manipulations and controlling the tasks of the information handling system 1000. Communication with the processing system 1002 may be implemented through a system bus 1010 for transferring information among the components of the information handling system 1000. The system bus 1010 may include a data channel for facilitating information transfer between storage and other peripheral components of the information handling system 1000. The system bus 1010 further provides the set of signals required for communication with processing system 1002 including a data bus, address bus, and control bus. The system bus 1010 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-600, and so on. Furthermore, the system bus 1010 may be compliant with any promulgated industry standard. For example, the system bus 1010 may be designed in compliance with any of the following bus architectures: Industry Standard Architecture (ISA), Extended Industry Standard Architecture (EISA), Micro Channel Architecture, Peripheral Component Interconnect (PCI), Universal Serial Bus (USB), Access bus, IEEE P6394, Apple Desktop Bus (ADB), Concentration Highway Interface (CHI), Fire Wire, Geo Port, or Small Computer Systems Interface (SCSI), for example.

Additionally, the information handling system 1000 includes a memory 1004. In one embodiment, memory 1004 is provided on SIMMs (Single In-line Memory Modules), while in another embodiment, memory 1004 is provided on DIMMs (Dual In-line Memory Modules), each of which plugs into suitable sockets provided on a motherboard holding many of the other components shown in FIG. 10. Memory 1004 includes standard DRAM (Dynamic Random-Access Memory), EDO (Extended Data Out) DRAM, SDRAM (Synchronous DRAM), or other suitable memory technology. Memory 1004 may also include auxiliary memory to provide storage of instructions and data that are loaded into the memory 1004 before execution. Auxiliary memory may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM).

The information handling system 1000 further includes a network connection device 1006. The network connection device 1006 communicates between the information handling system 1000 and a remote device, such as external devices, networks, information sources, or host systems that administer a plurality of information handling systems. For example, host systems such as a server or information handling system, may run software controlling the information handling system, serve as storage for an information handling system, or coordinate software running separately on each information handling system. The network connection device 1006 may provide or receive analog, digital, or radio frequency data. The network connection device 1006 preferably implements industry promulgated architecture standards, including Recommended Standard 232 (RS-232) promulgated by the Electrical Industries Association, Infrared Data Association (IrDA) standards, Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, 802.66 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), Universal Serial Bus (USB), and so on. For example, the network connection device 1006 may comprise a network adapter, a serial port, parallel port, printer adapter, modem, universal asynchronous receiver-transmitter (UART) port, and the like, or use various wireless technologies or links such as an infrared port, radio-frequency (RF) communications adapter, infrared transducers, or RF modem.

The information handling system 1000 further includes a display system 1012 for connecting to a display device 1014. The display system 1012 may comprise a video display adapter having all of the components for driving the display device, including video random access memory (VRAM), buffer, and graphics engine as desired. The display device 1014 may comprise a liquid-crystal display (LCD), or may comprise alternative type of display technologies, such as a light-emitting diode (LED) display, gas or plasma display, or employ flat-screen technology.

An information handling system 1000 may further include an input/output (I/O) system 1016 for connecting to one or more I/O devices 1018, 1020, and up to N number of I/O devices 1022. Input/output system 1016 may comprise one or more controllers or adapters for providing interface functions between one or more of I/O devices 1018–1022. For example, input/output system 1016 may comprise a serial port, parallel port, network adapter, printer adapter, radio-frequency (RF) communications adapter, universal asynchronous receiver-transmitter (UART) port, and the like, for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, and the like. It should be appreciated that modification or reconfiguration of the information handling system 1000 of FIG. 10 by one having ordinary skill in the art would not depart from the scope or the spirit of the present invention.

Although the invention has been described with a certain degree of particularity, it should be recognized that elements thereof may be altered by persons skilled in the art without departing from the spirit and scope of the invention. One of the embodiments of the invention can be implemented as sets of instructions resident in the memory 1004 of one or more information handling systems configured generally as described in FIG. 10. Until required by the information handling system, the set of instructions may be stored in another readable memory device, for example in a hard disk drive or in a removable memory such as an optical disc for utilization in a CD-ROM drive, a floppy disk for utilization in a floppy disk drive, a floppy/optical disc for utilization in a floppy/optical drive, or a personal computer memory card for utilization in a personal computer card slot. Further, the set of instructions can be stored in the memory of an information handling system and transmitted over a local area network or a wide area network, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the navigational aide of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method of providing a navigational aide, comprising:
   monitoring displayed data on a display device, wherein the displayed data having at least one section from a plurality of sections;
   detecting at least one marker of the plurality of sections of the displayed data, the marker being detected by identifying a boundary of the at least one section of the displayed data, the boundary having a threshold value located along a displayed bar of a displayed scroll box of a scroll bar software feature;
   identifying the boundary of the at least one section using a scroll height, the scroll height including a number of pixels in the body element, a scrollby procedure is utilized to determine how many pixels are scrolled per individual scroll occurrence, a variable is assigned a value of scroll height and reduced by the value of each found value of the scrollby procedure after a scroll occurrence, wherein when the variable is equal or less than the threshold value of the boundary of the section of the displayed data is detected; and
   displaying the navigational aide as a formatted pop-up menu proximally to at least one of a displayed cursor, the marker of the section of the displayed data, and the displayed bar, wherein the navigational aide is displayed in response to the detected marker of the section of displayed data.

2. The method as described in claim 1, wherein the navigation aide is formatted as a navigation bar.

3. The method as described in claim 1, wherein the marker includes at least one of the final line and final page of a display of data.

4. The method as described in claim 3, wherein the final line is indicated by an end-of-file marker.

5. The method as described in claim 1, wherein the marker includes a document object including a body element of the document object which specifies at least one of a beginning and end of a document.

6. The method as described in claim 1, wherein the marker includes a hypertext markup language (HTML) tag.

7. The method as described in claim 1, wherein the display of data includes a scroll bar software feature.

8. The method as described in claim 7, wherein the marker is detected when a display of a scroll box of the scroll bar software feature reaches near an end of a display of a bar.

9. The method as described in claim 7, wherein the marker is detected when a display of a scroll box of the scroll bar software feature reaches a threshold position located along an end of a display of a bar.

10. The method as described in claim 7, wherein the marker is detected when a display of a scroll box of the scroll bar software feature reaches at least one of an end of a display of a bar, near an end of a display of a bar and a threshold position located along an end of a display of a bar.

11. The method as described in claim 1, further comprising configuring the navigational aide based upon a context detected of the boundary of the section of the display of data.

12. The method as described in claim 11, wherein the context includes at least one of the data displayed, a location of a cursor and a location within the display of data.

13. The method as described in claim 11, wherein the context includes a location of a cursor.

14. The method as described in claim 11, wherein the context includes a location within the display of data.

15. The method as described in claim 1, wherein the monitored data includes at least one of a word processing document, web page and spreadsheet.

16. The method as described in claim 1, wherein the monitored data includes a web page.

17. The method as described in claim 1, wherein the monitored data includes a spreadsheet.

18. The method as described in claim 1, wherein the monitored data includes a first application, the navigational aide provides access to a second application.

19. The method as described in claim 1, wherein the navigational aide is displayed proximally to the marker of the section of the displayed data.

20. The method as described in claim 1, wherein the navigational aide is displayed proximally to a display of a scroll bar.

21. The method as described in claim 1, wherein the marker includes a final page of a display of data.

22. The method as described in claim 1, wherein the marker includes a document object including a body element of the document object which specifies an end of a document.

23. Program instructions storable on a medium readable by an information handling system for causing the information handling system method to execute steps for providing a navigational aide, comprising:
    monitoring displayed data on a display device, wherein the displayed data having at least one section from a plurality of sections;
    detecting at least one marker of the plurality of sections of the displayed data, the marker being detected by identifying a boundary of the at least one section of the displayed data, the boundary having a threshold value located along a displayed bar of a displayed scroll box of a scroll bar software feature;
    identifying the boundary of the at least one section using a scroll height, the scroll height including a number of pixels in the body element, a scrollby procedure is utilized to determine how many pixels are scrolled per individual scroll occurrence, a variable is assigned a value of scroll height and reduced by the value of each found value of the scrollby procedure after a scroll occurrence, wherein when the variable is equal or less than the threshold value of the boundary of the section of the displayed data is detected; and
    displaying the navigational aide as a formatted pop-up menu proximally to at least one of a displayed cursor, the marker of the section of the displayed data, and the displayed bar, wherein the navigational aide is displayed in response to the detected marker of the section of displayed data.

24. The program of instructions as described in claim 23, wherein the navigation aide is formatted as a navigation bar.

25. The program of instructions as described in claim 23, wherein the marker includes at least one of the final line and final page of a display of data.

26. The program of instructions as described in claim 25, wherein the final line is indicated by an end-of-file marker.

27. The program of instructions as described in claim 23, wherein the marker includes a document object including a body element of the document object which specifies at least one of a beginning and end of a document.

28. The program of instructions as described in claim 23, wherein the marker includes a hypertext markup language (HTML) tag.

29. The program of instructions as described in claim 23, wherein the navigational aide is displayed proximally to the marker of the section of the displayed data.

30. The program of instructions as described in claim 23, wherein the navigational aide is displayed proximally to a display of a scroll bar.

31. The program of instructions as described in claim 23, wherein the marker includes a final page of a display of data.

32. The program of instructions as described in claim 23, wherein the marker includes a document object including a body element of the document object which specifies an end of a document.

33. The program of instructions as described in claim 23, wherein the monitored data includes a web page.

34. The program of instructions as described in claim 23, wherein the monitored data includes a spreadsheet.

35. The program of instructions as described in claim 23, wherein the display of data includes a scroll bar software feature.

36. The program of instructions as described in claim 35, wherein the marker is detected when a display of a scroll box of the scroll bar software feature reaches at least one of an end of a display of a bar, near an end of a display of a bar and a threshold position located along an end of a display of a bar.

37. The program of instructions as described in claim 35, wherein the marker is detected when a display of a scroll box of the scroll bar software feature reaches near an end of a display of a bar.

38. The program of instructions as described in claim 35, wherein the marker is detected when a display of a scroll box of the scroll bar software feature reaches a threshold position located along an end of a display of a bar.

39. The program of instructions as described in claim 23, further comprising configuring the navigational aide based upon a context detected of the boundary of the section of the display of data.

40. The program of instructions as described in claim 39, wherein the context includes at least one of the data displayed, a location of a cursor and a location within the display of data.

41. The program of instructions as described in claim 39, wherein the context includes a location of a cursor.

42. The program of instructions as described in claim 39, wherein the context includes a location within the display of data.

43. The program of instructions as described in claim 23, wherein the monitored data includes at least one of a word processing document, web page and spreadsheet.

44. The program of instructions as described in claim 23, wherein the monitored data includes a first application, the navigational aide provides access to a second application.

45. An information handling, comprising:
a processor for executing a program of instructions on the information handling system;
a display device coupled to the processor for displaying data;
a memory coupled to the processor for storing the program of instructions executable by said processor for providing a navigational aide;
monitoring means for monitoring displayed data on a display device, wherein the displayed data having at least one section from a plurality of sections;
detecting means for detecting at least one marker of the plurality of sections of the displayed data, the marker being detected by identifying a boundary of the at least one section of the displayed data, the boundary having a threshold value located along a displayed bar of a displayed scroll box of a scroll bar software feature;
identifying means for identifying the boundary of the at least one section using a scroll height, the scroll height including a number of pixels in the body element, a scrollby procedure is utilized to determine how many pixels are scrolled per individual scroll occurrence, a variable is assigned a value of scroll height and reduced by the value of each found value of the scrollby procedure after a scroll occurrence, wherein when the variable is equal or less than the threshold value of the boundary of the section of the displayed data is detected; and
displaying means for displaying a navigational aide as a formatted pop-up menu proximally to at least one of a displayed cursor, the marker of the section of the displayed data, and the displayed bar, wherein the navigational aide is displayed in response to the detected marker of the section of displayed data.

46. The information handling system as described in claim 45, wherein the navigation aide is formatted as a navigation bar.

47. The information handling system as described in claim 45, wherein the marker includes at least one of the final line and final page of a display of data.

48. The information handling system as described in claim 47, wherein the final line is indicated by an end-of-file marker.

49. The information handling system as described in claim 45, wherein the marker includes a document object including a body element of the document object which specifies at least one of a beginning and end of a document.

50. The information handling system as described in claim 45, wherein the marker includes a hypertext markup language (HTML) tag.

51. The information handling system as described in claim 45, wherein the navigational aide is displayed proximally to the marker of the section of the displayed data.

52. The information handling system as described in claim 45, wherein the navigational aide is displayed proximally to a display of a scroll bar.

53. The information handling system as described in claim 45, wherein the marker includes a final page of a display of data.

54. The information handling system as described in claim 45, wherein the marker includes a document object including a body element of the document object which specifies an end of a document.

55. The information handling system as described in claim 45, wherein the monitored data includes a web page.

56. The information handling system as described in claim 45, wherein the monitored data includes a spreadsheet.

57. The information handling system as described in claim 45, wherein the monitored data includes at least one of a word processing document, web page and spreadsheet.

58. The information handling system as described in claim 45, wherein the monitored data includes a first application, the navigational aide provides access to a second application.

59. The information handling system as described in claim 45, wherein the display of data includes a scroll bar software feature.

60. The information handling system as described in claim 59, wherein the marker is detected when a display of a scroll box of the scroll bar software feature reaches at least one of an end of a display of a bar, near an end of a display of a bar and a threshold position located along an end of a display of a bar.

61. The information handling system as described in claim 59, wherein the marker is detected when a display of a scroll box of the scroll bar software feature reaches near an end of a display of a bar.

62. The information handling system as described in claim 59, wherein the marker is detected when a display of a scroll box of the scroll bar software feature reaches a threshold position located along an end of a display of a bar.

63. The information handling system as described in claim 45, further comprising configuring the navigational aide based upon a context detected of the boundary of the section of the display of data.

64. The information handling system as described in claim 63, wherein the context includes at least one of the data displayed, a location of a cursor and a location within the display of data.

65. The information handling system as described in claim 63, wherein the context includes a location of a cursor.

66. The information handling system as described in claim 63, wherein the context includes a location within the display of data.

* * * * *